Sept. 8, 1959
C. W. COOKE, JR
2,903,525
PHASE INVERTER
Filed Sept. 4, 1956
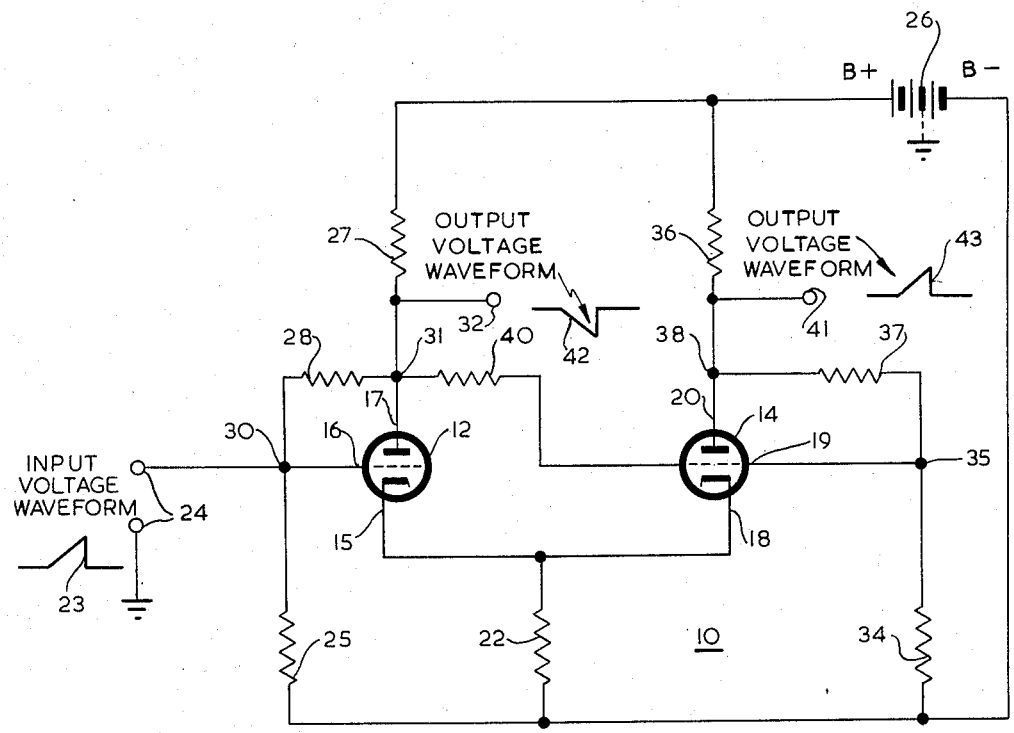
CLAUDE W. COOKE, JR.,
INVENTOR.
BY
ATTORNEY United States Patent Office 2,903,525
Patented Sept. 8, 1959

2,903,525

PHASE INVERTER

Claude W. Cooke, Jr., Pacific Palisades, Calif., assignor to Hughes Aircraft Company, Culver City, Calif., a corporation of Delaware Application September 4, 1956, Serial No. 608,648

3 Claims. (Cl. 179—171)

This invention relates to phase inverter circuits and more particularly to a self-balancing cathode-coupled inverter.

The desired overall response of a phase inverter is dependent upon the particular application thereof. The stability, linearization and gain requirements of a phase inverter will vary, for example, where a simple aternating current signal is merely of the wrong polarity for use with the associated circuits as opposed to the inversion of a complex waveform wherein all portions of the waveform must be inverted with a minimum of distortion. The linear response of a phase inverter circuit is particularly important in applications wherein a complex waveform is used to control a visual display such as appears on the face of a cathode ray tube. The specifications of a phase inverter are even more stringent when complex signals of opposite polarity are desired, such as may be derived from a cathode-coupled phase inverter. Accordingly, a stable phase inverter is desired capable of providing a linearized or distortion-free output and preferably a pair of linearized output waveforms of opposite polarity but of substantially the same amplitude.

It is, therefore, a general object of this invention to provide an improved and more stable cathode-coupled phase inverter capable of providing a pair of linearized and balanced output signals of opposite polarity.

It is another object of this invention to provide an improved self-balancing cathode-coupled phase inverter wherein feedback is employed to correct the distortion generated within the phase inverter and which phase inverter is compensated in part for the loss of gain due to the feedback while maintaining the distortion correction component of the feedback.

It is a further object of this invention to provide an improved cathode-coupled phase inverter arranged to be self-balancing and allowing the use of anode impedances of substantially equal impedance value.

It is still another object of this invention to provide a more stable cathode-coupled phase inverter that utilizes both of its vacuum tube circuits to maintain the phase inverter in balance.

Generally, the invention contemplates the provision of a pair of electron discharge devices arranged as a cathode-coupled phase inverter circuit. The phase inverter circuit employs a feedback voltage for correcting the distortion generated in the circuit while compensating in part for the loss of gain in one of the electron discharge devices. The compensation in the gain is effected by a balancing voltage for cancelling a portion of the feedback voltage while maintaining the linearization component of the feedback. This novel arrangement allows the use of substantially equivalent anode impedances to provide balanced outputs and also allows both tubes to be active for maintaining the circuit in balance.

Further and additional objects and advantages will become apparent hereinafter during the detailed description of an embodiment of the invention which is to follow and which is illustrated in the accompanying drawing, wherein the single view is a circuit diagram of a phase inverter embodying the invention.

Referring to the drawing, the construction and operation of the novel cathode-coupled phase inverter 10 will now be described. The phase inverter 10 employs a pair of electron discharge devices or vacuum tubes 12 and 14 such as the triodes illustrated. The tube 12 is provided with cathode, grid and anode electrodes identified by the reference characters 15, 16 and 17 respectively, while the tube 14 has similar electrodes identified by the corresponding reference characters 18, 19 and 20. As in the conventional cathode-coupled phase inverter the cathodes 15 and 18 are connected together by means of a common impedance element 22 and which common impedance element is not bypassed. The common impedance element 22 is shown as a resistive impedance element.

The input voltage wave shown as a sawtooth waveform 23 is applied to the phase inverter 10 by means of the input terminal 24 to be impressed on the grid 16 of the vacuum tube 12. A grid leak resistive impedance element is connected between the grid 16 and the negative terminal of a voltage source 26. The voltage source 26 is, in this instance, grounded intermediate its positive and negative output terminals as shown. The anode 17 for the vacuum tube 12 is provided with a resistive impedance element 27 and which impedance element is connected directly to the positive or B+ terminal of the voltage source 26. The vacuum tube 12 is further provided with a degenerative or negative feedback loop for passing energy from the anode circuit to the grid-cathode circuit thereof and which feedback loop comprises a resistive impedance element 28 connected between the anode at a junction 31 and the grid 16 at a junction point 30. The output from the vacuum tube circuit 12 may be derived across the anode resistor 27 and accordingly the output terminals 32 are connected therewith in a suitable manner; the upper of the terminals 32 is connected to the B+ side of the impedance 27 while the lower terminal is connected to the anode side of the impedance 27 as shown.

The vacuum tube 14 is similarly arranged with a grid leak resistive impedance element 34 connected to the grid 19 at a junction point 35 and to the negative terminal of the voltage source 26. The anode 20 for the vacuum tube 14 is connected to the positive terminal of the voltage source 26 by means of an anode impedance element 36. A degenerative feedback impedance loop is also provided for the vacuum tube 14 such as the resistive impedance element 37 connected between the junction point 35 and a junction point 38 in the anode circuit. The feedback resistors 28 and 37 respectively are arranged in a well known manner to correct the non-linear distortion components generated in their associated tube circuits.

In addition to receiving an operating signal from the common cathode resistor 22, in accordance with this invention the tube 14 is supplied with a compensating or balancing voltage in this instance derived from the anode circuit of tube 12 by connecting a resistive impedance element 40 between the junction 31 in the anode circuit thereof and the junction 35 in the grid circuit of the vacuum tube 14. The advantage of this balancing voltage connection will be explained more fully immediately hereinafter. The output voltage from the tube 14 may be derived from the output terminals 41 connected across the anode resistor 36 in the same manner as described in connection with the output terminals for the vacuum tube 12.

For the present, the operation of the phase inverter circuit 10 will be described with the assumption that the compensating resistor 40 has been removed from the circuit, to more fully explain the balancing action thereof. In the absence of the resistor 40, the vacuum tube 14 will derive its operating signal from the voltage developed across the cathode resistor 22. Theoretically in a cathode-coupled phase inverter circuit the voltage developed across resistor 22 is approximately one-half the voltage appearing at the junction 30 in the grid circuit of the vacuum tube 12. Accordingly, the negative feedback impressed through resistor 28 on the grid circuit of the vacuum tube 12 reduces the effective voltage at junction 30 and consequently that across the resistor 22. Similarly, the application of the feedback voltage developed across resistor 37 to the grid-cathode circuit of the vacuum tube 14 further reduces the grid-to-cathode voltage swing of the tube 14. This results in unbalanced output signals. In order to obtain a pair of output signals from each tube of substantially equivalent amplitude this unbalance must be compensated for, such as by the provision of unequally proportioned impedance values for the anode impedances 27 and 36.

Now, the operation of the phase inverter circuit 10 with the addition of the resistor 40 therein will be explained. The value of the resistor 40 is proportioned to balance out the fundamental component of any negative or degenerative feedback voltage generated across the resistor 37. The balancing voltage provided across the resistor 40 may be considered as a positive feedback as opposed to the negative feedback voltage developed across the resistor 37. However, the voltage developed across the resistor 40 is arranged to merely cancel out the fundamental component of the feedback voltage provided for the grid circuit of the tube 14, that is, the distortion components are only fed back to linearize the tube circuit. This voltage balancing action is provided through a voltage division relationship provided by the arrangement of the resistors 40 and 34 and the resistors 37 and 34 and which relationship is expressed mathematically by Equation 1 as follows:

$$e_{35} = \frac{|e_{31}|R_{34}}{R_{40}+R_{34}} - \frac{|e_{38}|R_{34}}{R_{37}+R_{34}}$$

wherein $e_{35}$ represents the value of the voltage at junction 35 and $e_{31}$ and $e_{38}$ represents the voltages at junctions 31 and 38 with respect to ground while the subscript of each R symbol identifies the various resistors identified by the corresponding reference characters.

In accordance with this invention the anode resistors 27 and 36 are made to be substantially equal to provide output waveforms 42 and 43 of substantially equal amplitude and of opposite phase across terminals 32 and 41 respectively. Accordingly, the balance of the tube circuits 12 and 14 depends upon the ratio of the resistance values of the resistor 40 and the resistor 37. Since it is desired to balance out the feedback voltage developed across the resistor 37, resistor 40 is made equal in resistance to resistor 37 and, accordingly, Equation 1 reduces to the following:

$$e_{35} = K(|e_{31}|-|e_{38}|) + K\delta_2 \qquad (2)$$

wherein K is a constant and $\delta_2$ represents the distortion components generated in tube 14. Accordingly, it may be appreciated from a consideration of Equation 2 that as long as the absolute value of $e_{31}$ is equal to the absolute value of $e_{38}$ the voltage $e_{35}$ will merely consist of the distortion components fed back from the junction 38 so that the linearization of the tube 14 will take place normally but the gain thereof will not be sacrificed. Under these operating conditions if an unbalanced state occurs due to tube or component variations a corrective signal results which is applied to the grid 19 of the tube 14. This correction signal is doubly effective due to the cross coupling of the tubes 12 and 14 through the common cathode resistor 22 and, accordingly, each tube is active to maintain the circuit in self balance. In practice it has been found that the coupling between the cathode is not truly fifty percent as in the theoretical case discussed hereinabove and, therefore, the balancing resistor 40 has a value which is not exactly equivalent to the value of the feedback resistor 37 as will be seen from the subsequent chart of circuit specifications.

It should be understood that the circuit specifications for the cathode-coupled phase inverter 10 may vary according to the design for any particular application. The following circuit specifications for the circuit shown are included by way of example only.

Tubes 12 and 14 may be a double triode such as the commercially available tube identified as type 12AT7WA. The tubes 12 and 14 may be provided with a B+ voltage of 300 volts and a B− voltage of 150 volts.

| | Ohms |
|---|---|
| R22 | 24,000 |
| R25 | 316,000 |
| R27 | 50,000 |
| R28 | 681,000 |
| R34 | 562,000 |
| R36 | 50,000 |
| R37 | 681,000 |
| R40 | 750,000 |

It is therefore apparent that the invention described hereinabove has advanced the state of the art by providing an improved cathode-coupled phase inverter circuit. This phase inverter circuit provides a pair of balanced output voltages of opposite polarity. The phase inverter circuit employs feedback voltages to provide output waveforms which are linearized and without sacrificing gain. The feedback voltages are employed in a novel manner to allow both tubes to be active in balancing the circuit and thereby provide a more stable output.

Having thus described the invention, what is claimed is:

1. A phase inverter apparatus comprising first and second electron discharge devices having first and second cathodes, first and second control electrodes and first and second anodes, respectively, said first and second cathodes being connected together and said first control electrode being responsive to input voltage excursions relative to a substantially fixed reference potential level; first and second resistors connected from said first and second anodes, respectively, to a first terminal; a third resistor connected from a second terminal to said first and second cathodes; a fourth resistor connected from said first anode to said first control electrode; a fifth resistor connected from said second anode to said second control electrode; a sixth resistor connected from said first anode to said second control electrode; and means connected to said first and second terminals for maintaining said first terminal at a first substantially fixed potential level and said second terminal at a second substantially fixed potential level that are, respectively, positive and negative relative to said reference potential level whereby output signals of opposite phase are developed across said first and second resistors.

2. The phase inverter apparatus as defined in claim 1 wherein the resistance of said sixth resistor is substantially equal to the resistance of said fifth resistor.

3. The phase inverter apparatus as defined in claim 1 which additionally includes seventh and eighth resistors connected, respectively, from said first and second control electrodes to said second terminal.

References Cited in the file of this patent

UNITED STATES PATENTS 2,524,134    Palmer    Oct. 3, 1950